United States Patent Office 3,407,175
Patented Oct. 22, 1968

3,407,175
REACTION PRODUCT OF AN EPOXY RESIN AND AN ADDUCT OF AN ISOCYANATE AND A POLYAMINE
Wayne E. Presley and Thomas J. Hairston, Lake Jackson, Tex., assignors to The Dow Chemical Company, Midland, Mich., a corporation of Delaware
No Drawing. Filed Feb. 10, 1966, Ser. No. 526,387
5 Claims. (Cl. 260—47)

ABSTRACT OF THE DISCLOSURE

This invention relates to compositions of matter comprising the reaction products of certain epoxy resins and a curing agent comprising an adduct of substantially equivalent amounts of certain organic isocyanates and certain polyamines. Such compositions are particularly suitable for use as rapid curing highly flexible coating compositions having excellent hardness and solvent resistance.

---

The curing agents contemplated by the present invention comprise the adduct of substantially equivalent amounts of (a) an organic isocyanate having the general formula:

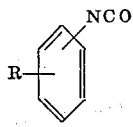

where R is selected from the group consisting of hydrogen, an alkyl radical containing from 1 to 8 carbon atoms, an alkoxy radical containing from about 1 to 8 carbon atoms, and the radical

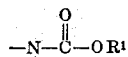

wherein $R^1$ is alkyl containing from 1 to 8 carbon atoms, and (b) a polyethylenepolyamine having the general formula:

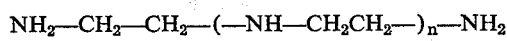

where $n$ is an integer from 0 to 15.

Illustrative of the organic isocyanates having the general formula previously given are the following: phenyl isocyanate, toluene monoisocyanate, butyl-N(4-methyl-3-isocyano-phenyl)carbamate, and 4-ethoxyphenylisocyanate.

Exemplary of the polyethylene polyamines contemplated herein are: diethylenetriamine, triethylenetetramine, and tetraethylenepentamine or mixtures thereof, which are liquid under normal conditions of temperature and pressure.

The adducts contemplated for use by the present invention are preferably prepared by reaction of the required amounts of the organic isocyanate and polyethylenepolyamine, in the absence of a reaction solvent, while employing a reaction temperature of between about 0° C. and 100° C. Such adducts are viscous liquids, which may crystallize over a period of several days but which may readily be admixed with an epoxy resin while in their liquid form in the absence of a thinner or solvent.

Among the epoxy resins which may be cured with the curing agents specifically described herein are the polyglycidyl derivatives of (1) dihydric phenols, (2) alkyl-substituted dihydric phenols, (3) halogen-substituted dihydric phenols, (4) bisphenols represented by the formula:

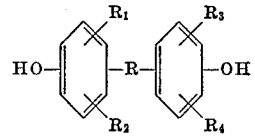

where R is selected from the group consisting of alkylene,

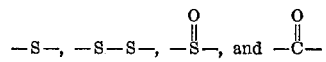

and wherein $R_1$, $R_2$, $R_3$ and $R_4$ are independently selected from the group consisting of hydrogen and halogen, (5) polyoxyalkylene glycols, and (6) the condensation products of formaldehyde and phenol, alkyl-substituted phenols or halogen-substituted phenols.

The compositions of this invention, comprising a curable mixture of an epoxy resin and the prescribed adduct, are characterized by a desirably low viscosity and relatively high equivalent weight and are particularly suitable for use as rapid curing coating compositions which do not require the presence of solvents and thinners for ease of handling and/or application to the surface to be coated. Further, the resulting cured products, while retaining their hardness and solvent resistance, are nevertheless highly flexible.

Various amounts of the polyamine-organic isocyanate adducts may be used to cure the epoxy resins. Generally, the adducts are used in amounts of from 10 to 50 parts by weight per 100 parts of epoxy resin. These amounts depend upon the amine hydrogen equivalent weight and the epoxide equivalent weight of the particular polyamine isocyanate adducts and epoxy resins employed.

The epoxy resin and adduct are combined by simply admixing the two together, generally at room temperature. Additional materials, such as fillers, pigments, fibers, dyes, plasticizers, peroxides—such as benzoyl peroxide, accelerators—such as triphenyl phosphite, and the like, can be added to the epoxy resins and/or adducts if desired.

The epoxy resin compositions of this invention are generally cured by heating such compositions at elevated temperatures, generally on the order of about 25 to about 75° C. for a period of time ranging from about 30 minutes to several hours depending on the temperature employed. The actual heating cycle will depend on the composition being cured. Room temperature curing, about 25° C., can be effected but generally requires several days.

Although the compositions of this invention have been described as particularly useful as coatings, they also have wide utility in the preparation of molded articles, as for example, electrical castings and the like.

Methods of preparing the compositions of the present invention and illustration of desirable and unexpected utility thereof, are illustrated in the following examples.

Example 1

To a reaction vessel equipped with a thermometer, a means for stirring and temperature control, and containing 515 grams (5 moles) of diethylenetriamine, were slowly added over a period of three hours, 119 grams (1 mole) of phenyl isocyanate with the temperature being held at 25–30° C. Excess diethylenetriamine was removed under a reduced pressure of between about 0.14 and 0.2 mm. Hg and a temperature of between about 65–70° C. The resulting adduct was a clear yellow liquid having a viscosity of about 100,000 cps. at 25° C. and an amine equivalent weight of 65.6. The adduct crystallized after a period of several days under normal room temperatures, i.e., about 25° C., but, when remelted and subsequently cooled to room temperature, remained in liquid form for a period of several days. This adduct is hereinafter identified as curing agent No. 1.

Example 2

In like manner as in Example 1, 876 grams of triethylenetetramine were reacted with 238 grams of phenyl isocyanate, and the excess triethylenetetramine removed under a reduced pressure of between about 0.3 to 1.0 mm. Hg and a temperature of between about 110–112° C. The resulting adduct was a clear, yellowish-red liquid having a viscosity of about 22,500 cps. at 25° C. and an amine hydrogen equivalent weight of 59.5. This adduct is hereinafter identified as curing agent No. 2.

Example 3

In like manner as in Example 1 and Example 2, 662 grams of a polyethylenepolyamine having an amine hydrogen equivalent weight of 36 and a molecular weight of about 540, were reacted with 119 grams of phenyl isocyanate wherein the phenyl isocyanate was added over a 1.5 hour period at a temperature of about 50° C. The resulting adduct was a viscous black liquid having a viscosity of about 3,500 cps. at 25° C. and an amine hydrogen equivalent weight of 48. This adduct is hereinafter identified as curing agent No. 3.

Example 4

In each of a series of experiments varying amounts of individual curing agents, as hereinafter designated, were mixed at normal room temperatures and in the absence of thinners or solvents, with an epoxy resin comprising a diglycidyl ether of 2,2-bis(4-hydroxyphenyl) propane having an epoxide equivalent weight of from 186 to 192 and a viscosity of 11,000–14,000 cps. at 25° C. The following Table I illustrates: the gel time for 50 gram samples of each resin mixture at 25° C.; the temperatures at peak exotherms of each resin mixture as determined on a differential thermal analyzer in a manner similar to that described by H. C. Anderson in Analytical Chemistry 32, 12, 1592–5 (1960) wherein the peak temperature for a given run corresponds to that at which the maximum rate of reaction is achieved; the heat distortion temperature of the cured material determined by the methods described in ASTM test No. D 648–45–T; and the hardness of the cured material as determined by the procedures outlined in the ASTM test No. D 785–48–T.

The data shown on Table I illusrtates the ability of the adducts of the present invention to reduce the gel time and lower the temperature at which peak exotherm occurs in the curing of the epoxy resins, as compared to utilization of non-modified polyethylene-polyamines or the designated adducts comprising a polyethylenepolyamine. It will further be noted, by reference to the heat distortion and hardness data included in Table I, that the physical properties of the compositions of this invention are not significantly affected.

Similar good results as specifically illustrated herein are obtainable utilizing compositions comprising any of the epoxy resin and curing agents contemplated herein.

What is claimed is:

1. A composition of matter comprising the reaction product of (1) 100 parts by weight of an epoxy resin having a plurality of 1, 2-epoxide groups per molecule, and (2) from about 10 to 50 parts by weight of a curing agent comprising the adduct of substantially equivalent amounts of (a) an organic isocyanate having the general formula:

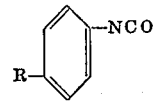

where R is selected from the group consisting of hydrogen, an alkyl radical containing from about 1 to 8 carbon atoms, an alkoxy radical containing from about 1 to 8 carbon atoms, and the radical

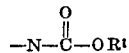

where $R^1$ is alkyl containing from about 1 to 8 carbon atoms, and (b) a normally liquid polyethylenepolyamine having the general formula:

where $n$ is an integer from 0 to 15.

2. The composition of claim 1 wherein said organic isocyanate is phenyl isocyanate.

3. The composition of claim 2 wherein said polyethylenepolyamine is diethylenetriamine.

4. The composition of claim 2 wherein said polyethylenepolyamine is triethylenetetramine.

5. The composition of claim 2 wherein said polyethylene polyamine has an amine hydrogen.

TABLE I

| Curing agent, type | Amt. phr of epoxy resin[1] | Gel time, minutes | Peak temp., °C. | Heat distortion, °F. | Hardness |
|---|---|---|---|---|---|
| This invention: | | | | | |
| (1) Diethylenetriamine and phenyl isocyanate | 36.6 | 5.2 | 192 | | |
| (2) Triethylenetetramine and phenyl isocyanate | 33 | 5.5 | 190 | 179 | 92 |
| (3) Polyethylenepolyamine of mol. wgt. 540 and amine hydrogen equivalent of 36 and phenyl isocyanate. | 26.7 | 14 | 210 | | |
| For comparison: | | | | | |
| (4) Diethylenetriamine | 11 | 21 | 235 | | |
| (5) Triethylenetetramine | 13 | 25 | 239 | 183 | 96 |
| (6) Polyethylenepolyamine (of 3 above) | 20.2 | 54 | 183 | | |
| (7) Adduct of 1 mole diethylenetriamine and 1 mole styron oxide. | 27 | 24 | 203 | | |
| (8) Adduct of 2 moles diethylenetriamine and 1 mole of the epoxy resin of Ex. 4. | 27 | 16 | 220 | | |

[1] Parts per hundred parts.

References Cited

UNITED STATES PATENTS 3,010,940  11/1961  Charlton et al. _____ 260—47

WILLIAM H. SHORT, *Primary Examiner.*